United States Patent [19]

Burgess

[11] 4,084,946
[45] Apr. 18, 1978

[54] DRILLING MUD DEGASSER

[76] Inventor: Harry L. Burgess, c/o Burgess & Associates, Inc., P.O. Box 8534, Houston, Tex. 77009

[21] Appl. No.: 801,540

[22] Filed: May 31, 1977

[51] Int. Cl.² .................... B01D 19/00; B01D 45/00
[52] U.S. Cl. .......................................... 55/184; 55/189; 55/192; 55/199; 55/406
[58] Field of Search ............... 55/41, 52, 55, 183, 55/184, 189, 100, 192, 406, 193

[56] References Cited

U.S. PATENT DOCUMENTS

| 3,324,629 | 6/1967 | Graswich et al. | 55/406 |
| 3,865,022 | 2/1975 | Ahlrick | 55/406 |
| 3,973,930 | 8/1976 | Burgess | 55/52 X |

Primary Examiner—Charles N. Hart
Assistant Examiner—Richard W. Burks
Attorney, Agent, or Firm—Bertram H. Mann

[57] ABSTRACT

Multiple sets of rotary impeller blades and an atomizing screen are located in the path of gas containing fluid, as drilling mud, discharged from a rotary body through a suction degassing chamber, for the purpose of more fully separating the gas from liquid constituents.

3 Claims, 1 Drawing Figure

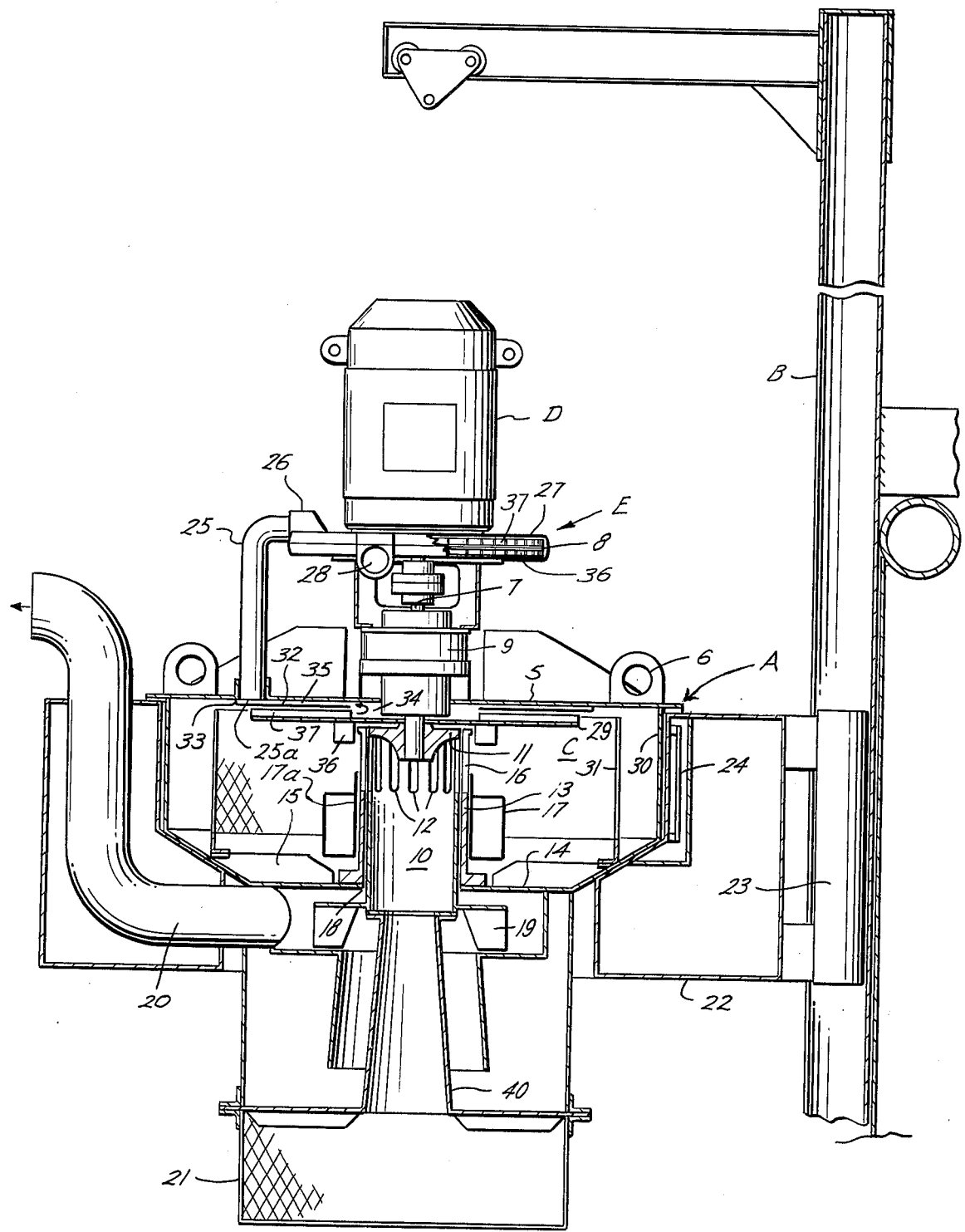

DRILLING MUD DEGASSER

BACKGROUND OF THE INVENTION

U.S. Pat. No. 3,999,965 and application Ser. No. 777,606, filed Mar. 15, 1977, disclose drilling mud degassing units in which the contaminated mud is centrifugally dispelled by an apertured, rotary body through a degasser chamber. Impeller blades or vanes adjacent the central inlet of the suction pump which evacuates the chamber, tend to direct liquid and solid constituents away from the pump inlet, while having little or no effect upon the gaseous constituents which are drawn into the pump or blower inlet. As the suction applied to the degassing chamber is increased to improve the liquid-gas separation, the tendency of liquid droplets to enter the pump inlet is also increased.

Consequently, it is an object of the present invention to further improve upon the liquid-gas separation in a degasser of the type disclosed in said patent and application, by increasing the depression in the suction or vacuum chamber while, at the same time, substantially increasing the mechanical gas-liquid separation to more effectively prevent the drawing of liquids into the suction pump and the discharge of gases with the cleaned mud.

Another object is to reduce the size of the degasser unit by constructing the contaminated mud discharge openings closer to the suction inlet than heretofore.

Still another object is to provide for gas discharge from the outer portion of the degassing chamber.

SUMMARY OF THE INVENTION

In the present disclosure, a commercially obtainable "regenerative" type of blower of improved efficiency is mounted above the degasser chamber, with its peripheral inlet connected to the outer, top portion of the degassing chamber and its dual vaned impeller driven by an axial shaft which extends centrally into the degassing chamber. A rotary body within the degassing chamber is secured to and driven by the shaft and extends downwardly into fluid connection with a contaminated mud supply pipe. The contaminated mud is centrifugally expelled through apertures in the rotary body and against and through a circumberential atomizing screen. A disc secured to the pump drive shaft between the chamber top and the rotary body has a first set of vanes depending in the path of the centrifugally expelled contaminated mud. A horizontal, annular baffle extends between the chamber top wall and the mentioned disc to form a tortuous gas discharge path with side by side entering and reentrant portions of thin, annular shape. A second set of radial vanes project above the disc within the entering portion of the gas path. The rotary body carries clean mud impeller blades adjacent the clean mud outlet in the chamber bottom. Certain features of the present invention are disclosed and claimed in my U.S. Pat. No. 3,973,930, as well as the above mentioned patent and application.

BRIEF DESCRIPTION OF THE DRAWING

In the accompanying drawing, the FIGURE is an elevation and vertical section through the improved unit.

DETAILED DESCRIPTION OF THE FIGURE

A generally cylindrical vessel A movably carried on a mast B, forms the degasser chamber C. Mounted above the ribbed top wall 5 of the chamber C, having handling eyes 6, is the motor D and the suction pump E of a type known commercially as a "regenerative" blower, having an impeller with a disc-like body 8 with oppositely projecting impeller vanes. The motor shaft 7 drives the blower impeller 8 and planetary gear box 9 and, at its lower extremity within chamber C, rigidly carries the cylindrical, rotary body 10 by means of the spider 11. Body 10 has longitudinal, mud-expelling slots 12 and makes a running fit within a tubular casing 13 upstanding from chamber bottom wall 14 radially ribbed at 15. In the upper part of casing 13 are windows 16 flush with slots 12. Slidable on casing 13 is the float 17 with upwardly projecting inner wall 17a which rises to occlude windows 16 and slots 12 and thereby limit the entry of mud in the chamber to the desired maximum level. Rotary body 10 depends through a central opening 18 in chamber bottom 14 and mounts clean mud evacuation vanes 19 within discharge pipe 20.

Depending from the lower end of rotary body 10, but no rotatable therewith is the converging-walled, contaminated mud inlet pipe 40 which, at its bottom, opens into a filter screen cup 21, which may be immersed in a body of contaminated, gas-containing drilling mud, as will be explained. Surrounding vessel 5 is a hollow, annular floation member 22, having jaws 23 partly encompassing the mast and slidable there along. Mast B may be part of a crane arrangement for manipulating the unit by means of cables secured to vessel eyes 6. A window 24 provides for inspection of the interior of the unit. Float member 22 insures immersion of the unit at the proper depth in the ambient mud pond.

A suction gas-evacuating pipe 25 extends upwardly from an opening 25a in the outer portion of chamber top wall 5 extending to the inlet fitting 26 at the periphery of blower E. The gas flows with impeller 8 about 270° around the periphery of blower casing 27 to the outlet fitting 28.

Centrally secured to motor shaft 7 between chamber top wall 5 and spider 11 is a disc 29 which extends outwardly about half way between shaft 7 and vessel side wall 30. Between the periphery of disc 29 and the tank side wall there is interposed an annular atomizing screen 31, for instance of expanded metal, against which the mud thrown by slots 22 strikes for atomization, some continuing radially to strike vessel wall 30 for further breaking up the liquid. Screen 31 extends slightly above the level of disc 29.

Interposed between disc 29 and top wall 5 is an annular baffle 32 closed at its periphery, as at 33. Baffle 32 forms with disc 29 and top wall 5 side by side, thin, annular gas outlet passage portions 34 and 35 forming a labrynthine path connecting the space in the degassing chamber C outside screen 31 to suction pipe 25 leading to the suction blower inlet 26. Depending from the inner portion of disc 29 are a first set of impeller blades or vanes 36 to which contaminated mud ejected from slots 12 and released gases in the cap of the suction chamber are initially exposed. Extending upwardly from disc 29 into first or entering has passage portion 34 are a second set of radial impeller vanes 37. Thus, released gases and foam are subjected successively to centrifugal slots 12, lower impeller blades 36, screen 31, and upper impeller vanes 37 for insuring maximum extraction of gas from the liquid constituents of the mud.

OPERATION

In operation when the unit is lowered into a pond or tank of contaminated and/or gas containing drilling mud, float member 22 insures immersion to the proper depth, with the upper parts constantly riding above the contaminated mud level. The motor is then started to draw ambient mud inward through filter screen 21 and inlet pipe 40, into rotary body 10, whence it is centrifugally ejected through slots 12 and windows 16. The initial expulsion of the mud from body 10 and exposure to suction in chamber C and first impeller blades 36 provide first stage gas separation. This expelled material then strikes screen 31 where it is further atomized, while at least some may continue radially to splash against side wall 30. Released gases inside and outside screen 31 pass into the outer end of passage portion 34 where they are vigorously beaten and centrifugally accelerated by upper vanes 37 to extract any retained droplets. The gases then reverse and flow through reentrant passage portion 35 to gas outlet pipe 25 and the inlet 26 of the suction blower. The rapid flowing of fluids through wide but shallow passage portions 34 and 35 contributes to the degassing action.

Because of the enhanced gas-liquid separation means provided, greater suction can be applied to the degasser chamber as, for instance, by the "regenerative" type of blower shown. The unit is more compact, lighter, and less expensive, yet more efficient than previous drilling mud degasser devices.

The invention may be modified in various respects, as will occur to those skilled in the art and the exclusive use of all modifications as come within the scope of the appended claims is contemplated.

I claim:

1. Degassing apparatus for drilling muds comprising a casing forming a degassing chamber having outer and top walls and a gas discharge opening in said top wall, suction means communicating with said opening, a hollow body extending into said chamber and having an inlet for gas containing mud and peripheral outlet means, power means including a shaft connected to said body for rotating said body to cause centrifugal discharge of mud into the outer portion of said casing, an annular baffle underlying said top wall and said outlet opening, an annular disc rigid with said shaft and extending along said baffle, said top wall, baffle and disc being serially arranged and spaced apart and cooperating to form a labyrinthine path for fluid drawn into said outlet opening, and vanes on said disc for repelling materials suspended in said labyrinthine path.

2. Degassing apparatus as described in claim 1 in which vanes are provided on opposite sides of said disc.

3. Degassing apparatus as described in claim 1 further including a vaporizing screen interposed between said body and the casing outer wall and in the path of fluids discharged from said body.

* * * * *